under the seal of the United States Patent Office.

United States Patent Office
2,978,387
Patented Apr. 4, 1961

2,978,387

METHOD OF STRIPPING UNREACTED MONOMER USING SILICONE COATED APPARATUS

Weldin G. Chapman and Chester C. Graves, Borger, Tex., assignors to Phillips Petroleum Company, a corporation of Delaware No Drawing. Filed Feb. 25, 1958, Ser. No. 717,321

10 Claims. (Cl. 202—46)

This invention relates to a silicone resin coated recovery vessel and a method for preparing and using the same. In one of its aspects, the invention relates to the stripping, distillation or recovery by an analogous method of a hydrocarbon material from a liquid in which it is contained by coating at least a portion of the internal surface of the recovery zone with a high molecular weight silicone polymer resin and then recovering said material in said zone. In another of its aspects, the invention relates to a vessel adapted to the recovery by distillation and/or stripping of a hydrocarbon material which tends to deposit tenacious or sticky polymeric materials during such a heat treatment, said vessel having on an internal surface thereof a silicone polymer resin in the form of a hard, dry, glossy film.

It is known in the chemical industry that there is often formed in stripping or distillation vessels or vessels of such character very tenacious or sticky polymer type deposits which are time consuming and expensive to remove. During the time which is required for removing such deposits the apparatus is, of course, out of use. Although various efforts have been made to prevent the formation of such expensively removed deposits, no truly satisfactory solution to the problem is now known to us.

We have now found that by coating the internal surface of a stripper column with a resin such as Dow Corning Silicone Resin R-671 and then baking the resin on the surface for about four hours at a temperature of about 450° F. there is formed a dry, hard, glossy film in the vessel from which the ordinarily difficultly removable tenaceous deposits can be stripped off with little effort even by hand. The formation of deposits is considerably minimized.

It is an object of this invention to provide a method and apparatus for the recovery at an elevated temperature of a material from a medium containing the same without the formation of tenacious or sticky deposits which ordinarily form in the recovery zone. It is another object of this invention to provide a method for so treating a recovery zone or vessel surface that ordinarily, tenaciously adhering deposits which are formed can be removed therefrom very readily. Another object of this invention is to minimize deposits.

Other aspects, objects, and the several advantages of this invention are apparent from this disclosure and the appended claims.

According to the invention there is provided a method for the distillation or stripping or recovery of a hydrocarbon material which, in the course of ordinary recovery employing heat, tends to form tenacious or sticky deposits of a polymeric character upon the internal surface of the recovery zone which comprises coating at least a portion of the internal surface of said zone with a silicone polymer resin resistant to the formation of such a deposit and then recovering said material in said zone.

Also according to the invention there is provided a method for treating the internal surface of such a zone as described by depositing on said zone before it is used for said recovery, a silicone polymer resin and baking said resin onto said surface to form a dry, hard, glossy film thereof.

Still according to the invention there is provided a vessel, the internal surface of which is coated with a dry, hard, glossy baked silicone polymer resin film.

Although the invention is possessed of wide applicability it will now be described as it may be applied to the recovery of a certain hydrocarbon. Thus, while the invention is applicable to the fractionation of a butadiene, butene, as these are recovered from a butane or butylene dehydrogenation, ethylene as it is recovered from the dehydrogenation of, say, butane, and also to the reclaiming of certain polymers picked up in solvents which are present in certain distillations, for example, furfural present in the disillation of butadiene, it will be described more specifically in connection with the stripping of unreacted styrene from a latex produced in the emulsion polymerization of butadiene and styrene in the production of a GR–S type rubber latex.

In the production of emulsion polymerized copolymers it is necessary to strip the unreacted styrene from the copolymers after unreacted butadiene has been flashed. It is customary to add the latex, after the butadiene has been flashed, into the top of a stripper column. The stripper column is composed of perforated trays with downcomers. Live steam is added to the bottom of the column for stripping the styrene from the latex as the latex flows down through the column. The stripped latex is removed as a kettle product from the column and the overhead styrene vapors are condensed. It is unnecessary to use reflux in this stripping operation.

In the operation of a stripper column it is necessary to clean deposited copolymers from the stripping column periodically. The columns are usually shut down and cleaned about once every four to six weeks. The plates are removed from large manholes located on the sides of the column and men enter the column and use a knife with an electrically heated plate for removing a large portion of the deposited polymers from each tray. Next the trays are removed in sections and solvent treated. The solvent loosens the copolymer on the trays and next the trays are steamed. The steam removes a large portion of the solvent treated polymers and then the trays are buffed. The cleaning of a tower requires about 90 man hours. The tower discussed is about 50 by 11 feet.

As a specific example of the unexpected and improved results of the use of the invention the following is given:

By the treatment of the stripper trays, as described in this invention, the rubber build-up on the trays was reduced approximately 90 percent. It was much easier to clean the trays since it was only necessary to cut the rubber which extended through the perforations in the tray and then remove the rubber deposited sheet from the tray by stripping it off by hand. The net saving in cleaning in the use of this invention is about $160.00 per column per cleanout. The man hours required are only 16 compared to 90 which was required without the use of the present invention.

The treatment to which reference has been made was effected using a solution of a polydimethyl silicone of high molecular weight in aromatic hydrocarbon solvent obtained in the trade under the name of Dow Corning Silicone Resin R–671. This material was used full strength as obtained and was sprayed or brushed in a well ventilated area, free of dust, on the various portions of the stripper trays. Both types of application appear to give similar results. The layer or film of resin solution was allowed to dry to touch and then baked at about 450°

F. until a dry, hard, glossy film could be observed. This took approximately four hours.

The specific material which was used in the above example contained 20 percent of solids in an aromatic hydrocarbon solvent, had an amber color and a viscosity at 25° C. of 3–8 centistokes. The solids content of 20 percent was determined by heating the solution for three hours at 135° C. The solution had a specific gravity at 25° C. of 0.88–0.89 and a flash point, minimum, of 80° C.

The conditions of application of any particular applicable silicone resin or high molecular weight silicone polymer can be readily determined by mere routine tests by one skilled in the art in possession of this disclosure. Generally, the length of baking or curing time will be dependent upon the baking temperature which is used. Infrared heating or flame heating or any other kind of heating can be used. Generally, we have found that a temperature of at least 300° F. will be effective to give the film herein described in a reasonable length of time, say, 2 to 6 hours. The precise thickness of the layer of solution applied, prior to using or baking, is not critical. Thus, so long as there is formed a coating completely covering the surface which, it is desired to render readily cleanable, the spraying or brushing is merely effected in as neat a manner possible, always insuring complete coverage. When used extended in a diluent or solvent, the surface of the vessel being treated will ordinarily retain a coating of the order of approximately 0.1 to 1 or 2 millimeters thick. Coatings thinner or, for that matter, even thicker than those just described are within the scope of the invention. When a thicker coating is laid down the baking or curing time will be found, in some instances, to have been increased. Therefore, the thickness of the coating, the length of time it is to be used, and other factors here discussed will naturally be balanced to obtain the desired overall or optimum results.

Generally, in a preferred form of application of the coating according to this invention, the surface to which the coating is to be applied will be treated even though this surface appears to the naked eye to be quite clean. Thus, any grease, oil, scale, and even dust are removed, since application to the bare metal surface yields best results.

Although the invention has been described with reference to a specific silicone polymer material, it is within the scope of this invention to apply to the surface of a vessel, as described, to minimize deposits thereon and to render such deposits as do form more readily removable therefrom other silicone materials. Suffice to say to one skilled in the art in possession of this disclosure that the silicone materials should have good adhesive qualities respecting metallic surfaces and if this quality is observed in the material it can be used to obtain results according to this invention whether it be thermosetting or a silicone oil or liquid. Thus, there are known polymeric alkylated siloxy materials or silicones which can be characterized by the dimethylsiloxy, diphenylsiloxy and methylphenylsiloxy groups

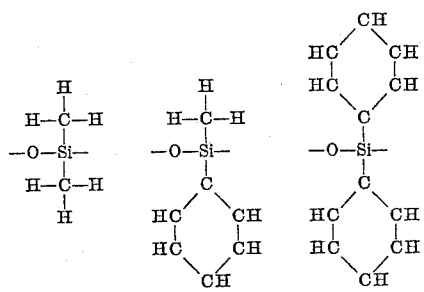

in which the methyl and phenyl groups, as shown, are found attached to the silicon atoms. These materials can possess a large number of such groups and ordinarily will contain about 20 or more of such groups and will have a molecular weight greater than about 2,000 as determined by ultimate viscosity techniques. Other groups may be found in such materials as have just been described which will provide a permanently viscous, non-thermosetting film upon the vessel surface.

There are also known silicone oils of low volatility and very low vapor pressure which are characterizable by their insolubility in water and low aliphatic alcohols but which are soluble as indicated herein in certain organic solids. These oils can be polymerized at elevated temperatures to form a series of resinous materials which are heat hardenable.

Generally, the invention of the appended claims is in the finding that certain silicones, as these are generally referred to in industry, are applicable to minimization and ready removal of deposits in distillation or other vessels in which liquids are heated to rather high temperatures. One skilled in the art in possession of this disclosure can readily determined by mere routine testing the specific "silicone" which is applicable for his purpose. Generally, respecting the heat hardenable resinous methyl silicone the reader is referred to U.S. Patent 2,258,218, issued October 7, 1941.

The invention has wide application to recovery of hydrocarbons which tend to form tenacious or sticky deposits which can be of a polymeric character. These hydrocarbons include butadiene, styrene, ethylene, butene, vinylcyclohexene, and ethylbenzene.

Reasonable variation and modification are possible within the scope of the foregoing disclosure and the appended claims to the invention, the essence of which is that there have been provided a method and apparatus which minimizes deposits and facilitates removal of materials in distillation or other vessels which comprises the use of a coating of silicone, as described.

We claim:

1. A method of steam stripping an unreacted monomer from a latex prepared by emulsion copolymerization of butadiene and styrene to form a GR–S type rubber-containing latex which comprises coating at least a portion of the internal surface of a stripping zone with a polydimethyl silicone resin dissolved in a solvent, heating said coating of resin at a temperature and until there is formed a dry, hard, glossy coating on said surface and then steam stripping said latex in said zone to remove the unreacted monomer therefrom.

2. A method for the stripping of a styrene monomer from a GR–S type latex which comprises coating at least a portion of the internal surface of a stripping zone with a silicone polymer resin resistant to the formation of a sticky deposit and then stripping the styrene monomer from said latex in said zone said coating being formed by dissolving a resin selected from the group consisting of polydimethyl-, polydimethylsiloxy-, and polymethylphenylsiloxy silicone resins in an aromatic solvent, applying the solution to said surface, allowing it to dry, and then baking it at a temperature in excess of 300° F. until a dry, hard, glossy film is obtained.

3. A method according to claim 2 wherein said solution has a viscosity of 3–8 centistokes.

4. The removal of unreacted monomer from a latex prepared by a water-containing emulsion polymerization of a monomer to produce said latex which comprises coating a stripping zone with a silicone resin selected from polydimethyl-, polydimethylsiloxy-, and polymethylphenylsiloxy silicone resins resistant to forming a deposit of ordinarily strongly adhering polymer when the latex is stripped with live steam and then stripping said latex in said zone with live steam said coating being formed by dissolving said resin in an aromatic hydrocarbon solvent, applying the solution thus obtained to said surface, allowing it to dry, and then baking it at a temperature in excess of 300° F. until a dry, hard, glossy film is obtained.

5. A method of steam stripping an unreacted monomer from a reaction mass which comprises coating at least a portion of the internal surface of a stripping zone with a polydimethyl silicone resin, heating said coating of resin at a temperature and for a time sufficient to form a dry, hard, glossy coating on said surface and then steam stripping said latex in said zone to remove the unreacted monomer therefrom, said dry, hard, glossy coating being formed by dissolving said resin in an aromatic solvent, applying the solution to said surface, allowing the solution to dry, and then baking at an elevated temperature until said dry, hard, glossy coating is obtained.

6. A method according to claim 5 wherein the hydrocarbon material which is recovered is selected from the group consisting of butadiene, styrene, ethylene, butene, vinylcyclohexene and ethyl benzene.

7. A method of steam stripping an unreacted monomer from a reaction mass which comprises coating at least a portion of the internal surface of a stripping zone with a polydimethylsiloxy silicone resin, heating said coating of resin at a temperature and for a time sufficient to form a dry, hard, glossy coating on said surface and then steam stripping said latex in said zone to remove the unreacted monomer therefrom, said dry, hard, glossy coating being formed by dissolving said resin in an aromatic solvent, applying the solution to said surface, allowing the solution to dry, and then baking at an elevated temperature until said dry, hard, glossy coating is obtained.

8. A method according to claim 7 wherein the hydrocarbon material which is recovered is selected from the group consisting of butadiene, styrene, ethylene, butene, vinylcyclohexene and ethyl benzene.

9. A method of steam stripping an unreacted monomer from a reaction mass which comprises coating at least a portion of the internal surface of a stripping zone with a polymethylphenylsiloxy silicone resin, heating said coating of resin at a temperature and for a time sufficient to form a dry, hard, glossy coating on said surface and then steam stripping said latex in said zone to remove the unreacted monomer therefrom, said dry, hard, glossy coating being formed by dissolving said resin in an aromatic solvent, applying the solution to said surface, allowing the solution to dry, and then baking at an elevated temperature until said dry, hard, glossy coating is obtained.

10. A method according to claim 9 wherein the hydrocarbon material which is recovered is selected from the group consisting of butadiene, styrene, ethylene, butene, vinylcyclohexene and ethyl benzene.

References Cited in the file of this patent

UNITED STATES PATENTS

| | | |
|---|---|---|
| 2,433,060 | Ohsol et al. | Dec. 23, 1947 |
| 2,451,332 | Green | Oct. 12, 1948 |
| 2,462,013 | Waterman | Feb. 15, 1949 |
| 2,462,242 | Webb et al. | Feb. 22, 1949 |
| 2,514,207 | Johnson | July 4, 1950 |
| 2,588,393 | Kauppi | Mar. 11, 1952 |
| 2,615,010 | Troyan | Oct. 21, 1952 |
| 2,662,001 | Burns et al. | Dec. 8, 1953 |
| 2,672,104 | Clark | Mar. 16, 1954 |
| 2,695,246 | Jurgensen et al. | Nov. 23, 1954 |
| 2,729,538 | Hull | Jan. 3, 1956 |
| 2,811,408 | Braley | Oct. 29, 1957 |
| 2,867,425 | Teller | Jan. 6, 1959 |

OTHER REFERENCES

McGregor: "Silicones and Their Uses," June 1957, pages 116, 130–131, and pages 199–201.